Patented Jan. 26, 1937

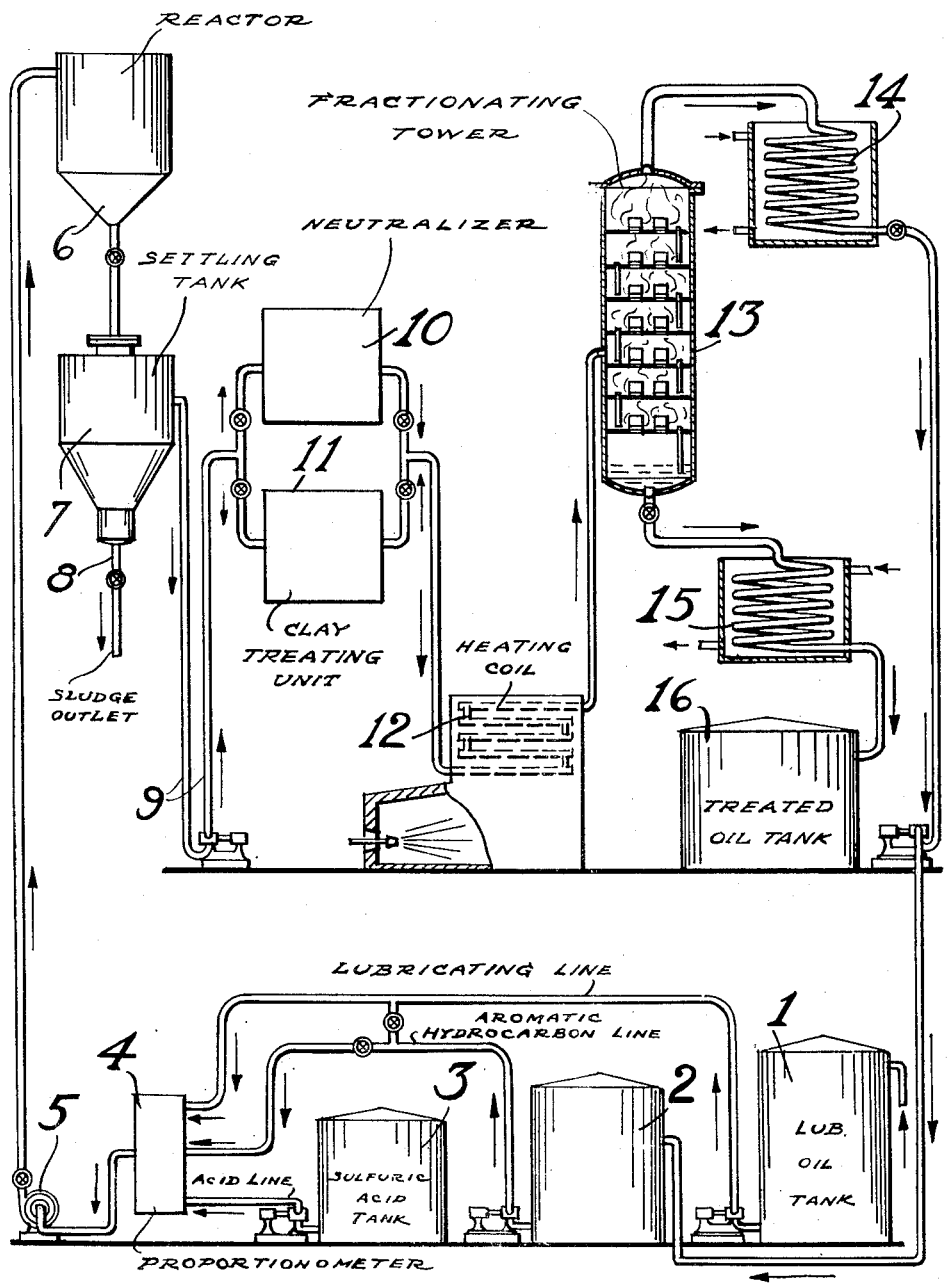

2,068,847

UNITED STATES PATENT OFFICE 2,068,847

PROCESS OF TREATING A PETROLEUM OIL

Garland H. B. Davis and Jones I. Wasson, Elizabeth, N. J., assignors to Standard Oil Development Company, a corporation of Delaware Application December 8, 1934, Serial No. 756,672

2 Claims. (Cl. 196—40)

This invention relates to a novel method of treating mineral oils with acid and will be fully understood from the following description when read in conjunction with the drawing, the sole figure of which is a diagrammatic side elevation partly in section of an apparatus appropriate for carrying out the invention.

The principal object of the present invention is to treat mineral oils with sulfuric acid in the presence of an aromatic hydrocarbon or a partially hydrogenated aromatic or polycyclic aromatic hydrocarbon, such as tetrahydronaphthalin, whereby an easy separation of the acid sludge is obtained. Instead of the aromatics, products containing such hydrocarbons may be used. Thus, good results have been obtained with naphthas obtained by vapor phase destructive hydrogenation, in the presence of a sulfactive catalyst, of petroleum distillates such as, for example, of the extract obtained from a kerosene stock by treatment with liquid sulfur dioxide. Another object of the invention is an improved treating process which allows an appreciable reduction of the amount of sulfuric acid and/or decolorizing clay necessary for treatment.

Other objects and advantages of our process will be evident in the course of the following description.

The oil to be treated may be any of the known mineral oils such as petroleum oil, shale oil, oils produced by hydrogenation, etc. Distillates or residual products may be equally well treated according to the present process. Further, oils which have obtained a previous treatment such as destructive hydrogenation, solvent extraction or an aluminum chloride treatment, may be treated with sulfuric acid according to the present process with a very pronounced advantage since the aromatic hydrocarbon added helps the formation of a fluid sludge free of pepper or suspended particles.

The acid used for treatment may be 100% sulfuric acid or a dilute sulfuric acid containing, for example, 50% or more acid. Its amount may vary within broad limits, say from 0.5% to 30%. The invention comprises the agitation of the oil to be treated with the sulfuric acid in the presence of an aromatic hydrocarbon or an equivalent as disclosed. We may mention benzene, toluene, the xylenes, mixtures of these hydrocarbons, tetralin, hydrogenated SO2 extract from a kerosene stock, as examples. Toluene gives in general a very satisfactory result when used in amounts of 1-3% by volume of the oil. The amount of the aromatic hydrocarbon added may in general be 1-10% to 20 or 30% by volume of the oil to be treated, but it may be less or even more. The aromatic hydrocarbon or its equivalent is preferably admixed with the oil to be treated and then the acid is added and the solution agitated with the acid. After the agitation the sludge layer is separated from the oil layer and the latter is washed and sweetened with alkali or steam as usual. The acid oil may also be finished by contacting with finely divided adsorbent clay at an elevated temperature, say above 250° F. or by filtration through coarse clay at a somewhat lower temperature. In some cases, especially when treating lubricating oil stocks, it may become necessary to follow up the acid treatment with a distillation step in order to remove the last traces of aromatic hydrocarbon from the lubricating oil. It is not necessary to add the aromatic hydrocarbon to the oil prior to the acid treat but the acid and the aromatic hydrocarbon may be added simultaneously to the oil. Good results may also be obtained by admixing the acid and the aromatic hydrocarbon with each other and then treating the oil with this mixture. In most cases, however, it is preferable to add the aromatic hydrocarbon to the oil to be treated. The strength of the acid used in our process is such as is not normally used for sulfonating aromatics. To be more specific, we do not intend to admix the aromatic hydrocarbon with fuming sulfuric acid and treat the oil with the aromatic sulfonates thus obtained. In all these variations, it is the essential feature of our process that the oil to be treated is agitated with a non-fuming sulfuric acid in the presence of added aromatic hydrocarbons.

We do not know the exact nature and mechanism of the chemical reactions taking place in our process. We believe, however, without limiting our invention in any way by theoretical considerations, that the presence of the aromatic hydrocarbons permits the ready removal of unsaturated hydrocarbons and the sulfur and nitrogen compounds of the oil by condensation with these hydrocarbons. The presence of aromatics or their equivalents prevents the oxidation of the oil by the sulfuric acid and the formation of pepper sludge and promotes the coagulation of asphaltic materials. A fluid, easily removable sludge is obtained in our process. It appears that the presence of both aromatic and unsaturated hydrocarbons together allows the reduction of the acid required to obtain a given color improvement by 50% or even more. In most cases we prefer not to reduce the amount of the sulfuric acid but rather the amount of the decolorizing clay. A given color improvement is obtained in our process with considerably less clay than in the usual practice of acid in clay treating lubricating oils.

Referring now to the drawing, the sole figure will be described in conjunction with the method of operating the same. Lubricating oil stock from storage tank 1, aromatic hydrocarbon from storage tank 2 and sulfuric acid from tank 3 are passed through the proportionometer 4 and the centrifugal pump and mixer 5 into the reactor 6. The lubricating oil stock and the aromatic hydrocarbon may be previously admixed with each other before they are discharged into the proportionometer. From the reactor 6 the mixture of oil and sludge is discharged into the settling tank 7 from which the sludge is removed through line 8 and the lubricating oil through line 9. The acid lubricating oil stock from line 9 may be either passed through a neutralizer 10 or through a clay treating unit 11, after which it is submitted to distillation by pasage through heating coil 12 into the fractionating tower 13. The aromatic hydrocarbon is removed as overhead product condensed in condenser 14 and returned to the storage tank 2. The treated oil is cooled by passage through cooler 15 and is then discharged into storage tank 16. The following example will illustrate our invention. A mixture of 75% of lubricating oil stock obtained from petroleum oil by destructive hydrogenation and 25% Mid-Continent tar bottoms were treated with 20 pounds of 98% acid. After blending the oil with varying amounts of toluene, all samples were finished by contacting the oil remaining after the sludge separation with 5% of clay at a temperature of about 350° F. The final colors were noted. The results obtained were as follows:

| Pounds acid (98%) (batch treat) | Pounds toluene added to oil before acid | Percent clay contact | Color, Robinson (not dewaxed) |
|---|---|---|---|
| 20 | None | 5 | 1 |
| 20 | 5 | 5 | 4½ |
| 20 | 3 | 5 | 4¾ |

Some of the modifications of our process were mentioned above. Other modifications will be apparent to those skilled in the art. Thus, for example, the acid treat according to the present invention may be preceded or followed by treatment of the oil with a selective solvent, such as phenol, aniline, furfural, etc. The oils prepared may be blended with thickeners, oxidation inhibitors, sludge dispersers, dyes, soaps, metallo organic compounds, resins, pour inhibitors, carbon protectors, etc. The invention is not to be limited by the example given for illustration but only by the following claims in which it is our intention to claim all novelty inherent in the invention.

What we claim is:

1. The process of treating a petroleum oil which normally, upon treatment with sulfuric acid, gives rise to a peppery, not readily separable sludge, with non-fuming sulfuric acid, which comprises agitating the oil with sulfuric acid of at least 50% concentration in the presence of an added normally liquid unsaturated cyclic hydrocarbon in amount of from 1 to 10% of the oil, and separating the sludge formed from the oil.

2. Process according to claim 1 in which a petroleum lubricating oil stock is treated with sulfuric acid in the presence of 1–3% of added toluene.

GARLAND H. B. DAVIS.
JONES I. WASSON.